United States Patent [19]

Marsden

[11] 4,141,093
[45] Feb. 27, 1979

[54] SLEEPING BERTH FOR PASSENGER CAR COMPARTMENT

[75] Inventor: Dennis B. Marsden, Griffith, Ind.

[73] Assignee: Pullman Incorporated, Chicago, Ill.

[21] Appl. No.: 860,506

[22] Filed: Dec. 14, 1977

[51] Int. Cl.² .................... B62D 33/06; A47C 17/40
[52] U.S. Cl. .......................................... 5/9 R; 5/331; 5/118
[58] Field of Search ................. 5/9 R, 9 B, 118, 331

[56] References Cited

U.S. PATENT DOCUMENTS

| 1,596,099 | 8/1926 | Hartwell | 5/331 |
| 3,353,861 | 11/1967 | Froitzheim et al. | 5/118 X |
| 3,588,168 | 6/1971 | Froitzheim | 5/118 |
| 4,054,956 | 10/1977 | Quakenbush | 5/9 R |

*Primary Examiner*—Casmir A. Nunberg
*Attorney, Agent, or Firm*—Thomas G. Anderson

[57] ABSTRACT

A sleeping berth for a passenger car compartment includes a tubular bed frame and mattress combination which is hingedly movable between use and non-use positions to a side wall of the car. The bed frame is latched in the non-use position and includes webbing which is spring loaded to urge the bed into the non-use position upon initial movement when raising the berth from a sleeping or use position.

22 Claims, 11 Drawing Figures

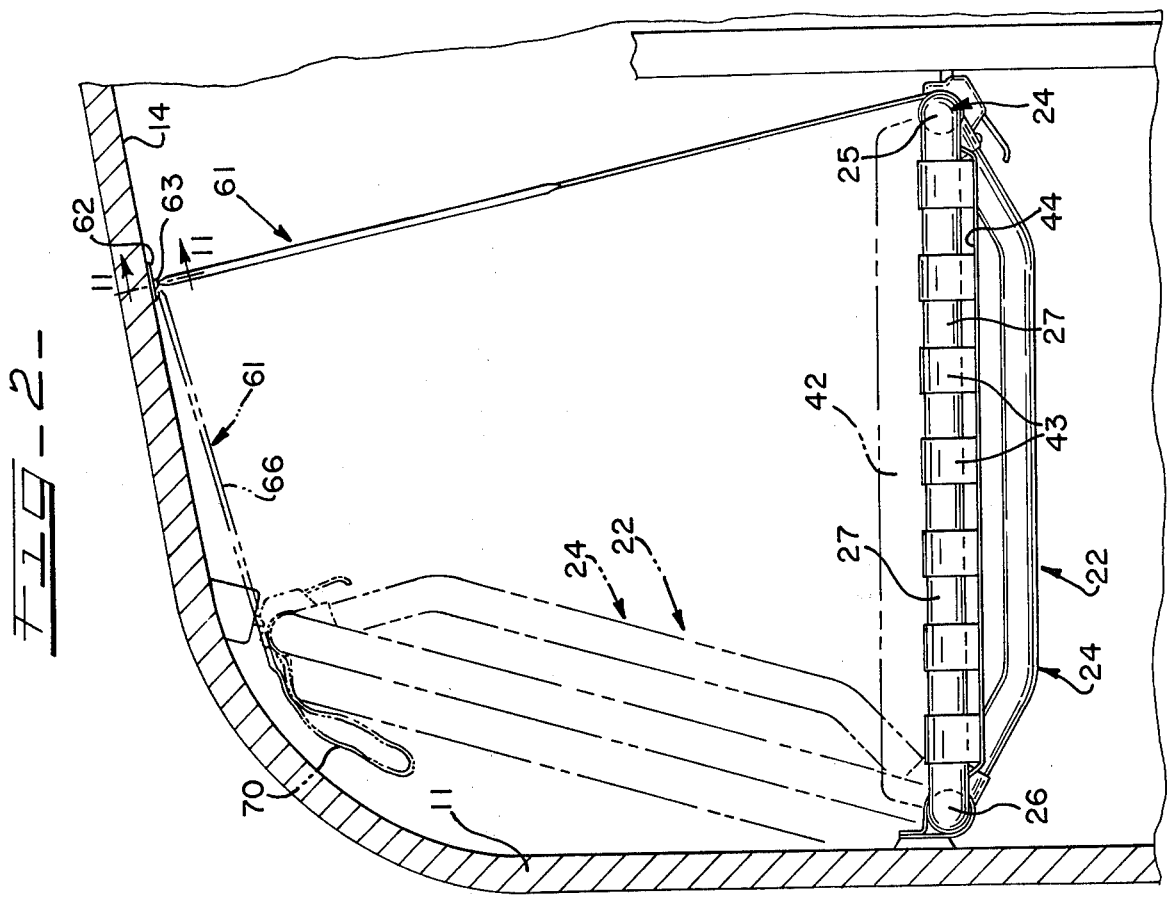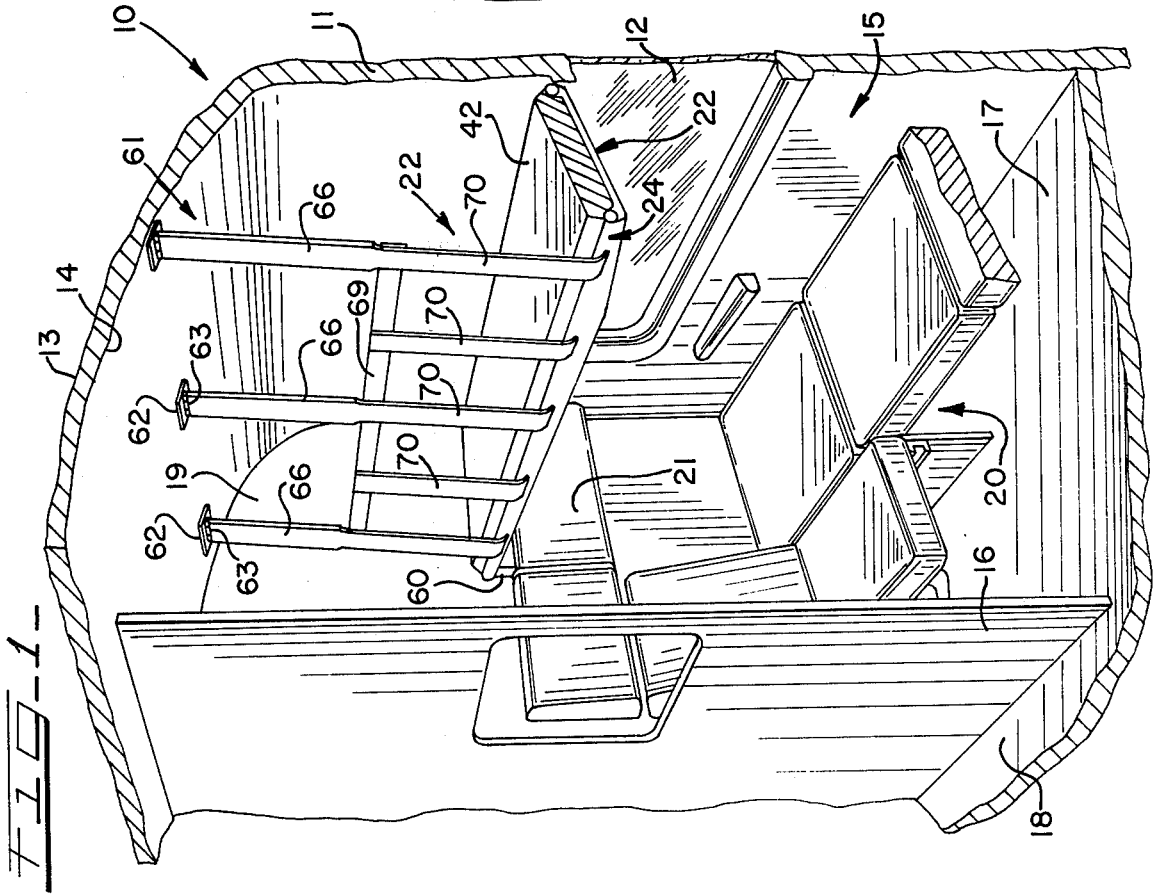

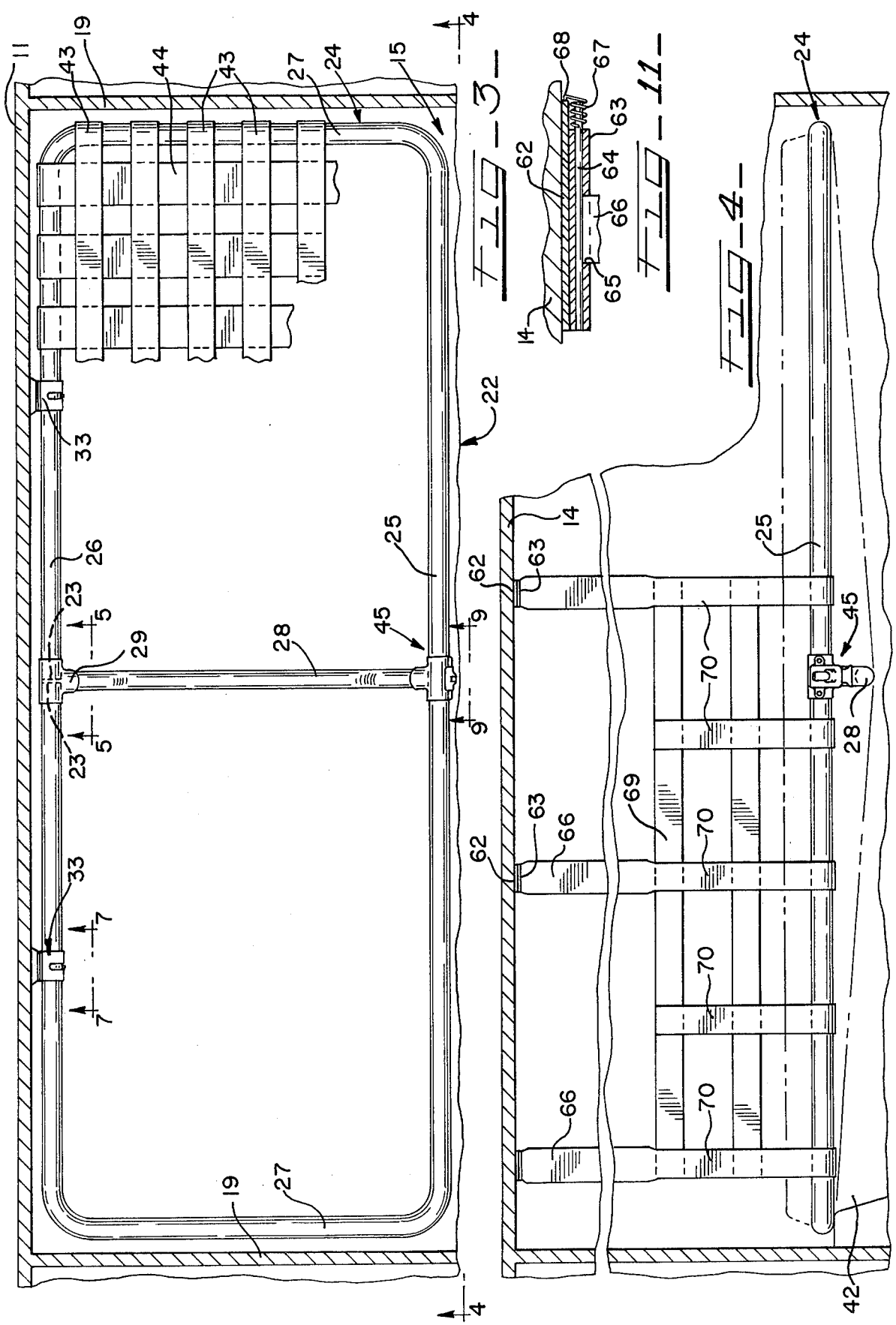

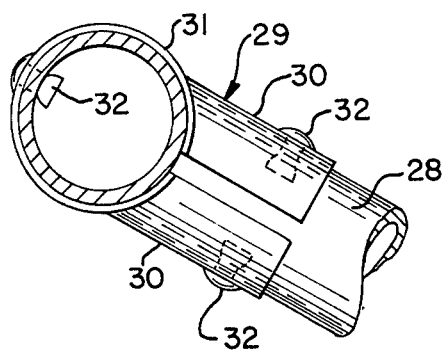
FIG-6-
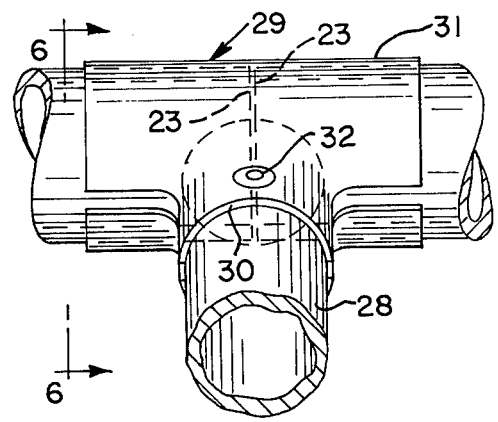
FIG-5-
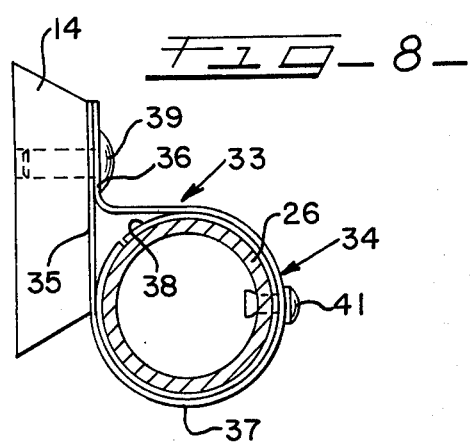
FIG-8-
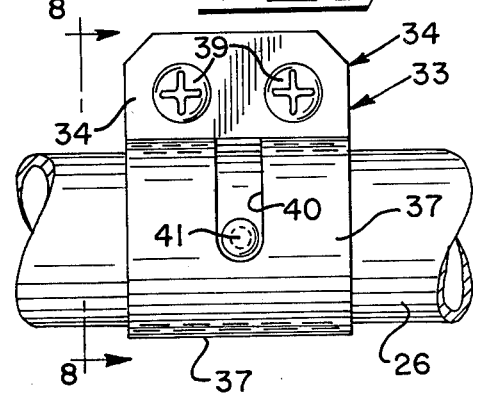
FIG-7-
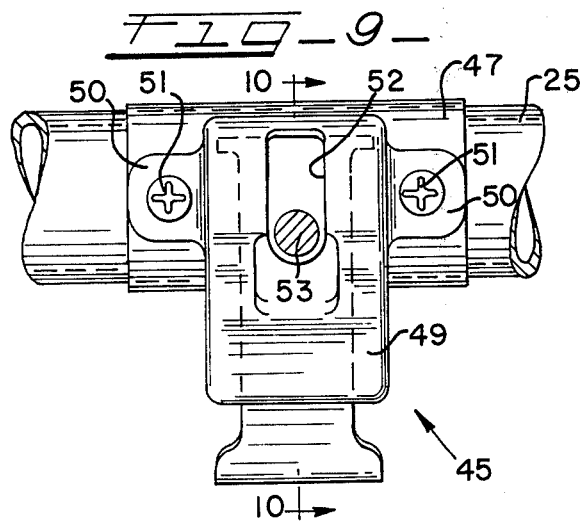
FIG-9-
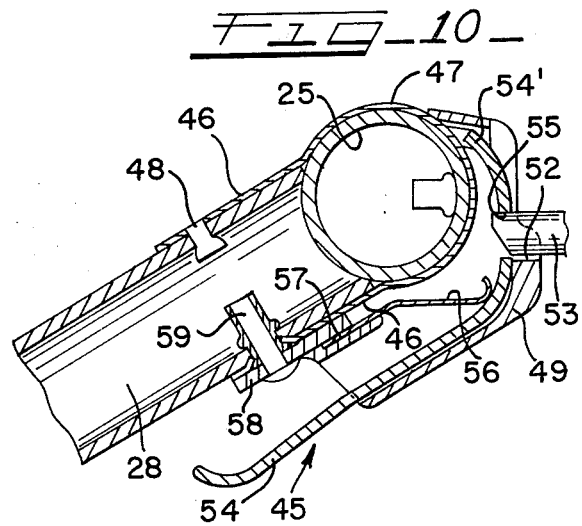
FIG-10-

SLEEPING BERTH FOR PASSENGER CAR COMPARTMENT

BACKGROUND OF THE INVENTION

1. Field of the Invention

The present invention relates to a sleeping berth for a passenger car compartment and more particularly to a tubular bed frame which is hingedly movable between use and non-use positions.

2. Description of the Prior Art

Patents pertinent to the present invention include U.S. Pat. Nos. 533,031, Jan. 22, 1895; 699,363, Mar. 5, 1901; 686,944, Nov. 19, 1901; 1,014,126, Jan. 9, 1912; 828,131, Aug. 7, 1906; 1,253,549, Jan. 15, 1918; 2,673,353, Mar. 30, 1954; and 2,953,792, Sept. 27, 1960. The present invention is an improvement over the aforementioned patents.

SUMMARY OF THE INVENTION

The present invention comprises a sleeping berth which is hingedly connected to one side of the railway car and may be readily moved between use and non-use positions by a passenger occupying a railway car compartment. The sleeping berth comprises a tubular frame which is hingedly connected to the car sides by means of hinge straps having anti-friction bearing elements which are wrapped about the rear tubular member of the tubular frame. The frame also includes an intermediate member which is of arcuate shape extending below the plane of the frame for assisting in the supporting of a suitable mattress which is carried and supported on the frame by a plurality of flexible webbing upon which the mattress rests, said webbing being connected to the sides and ends of the tubular frame. In the use position the bed and frame are supported by means of a plurality of vertical straps which with the addition of a cross strap provide not only a support for the bed but also a safety webbing to prevent dislocation of a sleeping passenger from the bed. The webbing comprises upper semi-rigid members in turn connected to flexible straps which in turn are connected to and support the side frame members of the bed frame. The semi-rigid straps are connected to the ceiling or roof of the car by means of lightly spring-loaded hinge members which urge the bed frame upward and outwardly to the non-use position. In order to return the bed to its non-use position, the bed is merely lifted slightly manually and the semi-rigid straps and flexible straps are sufficiently biased to move the bed to the non-use position. A spring-loaded latch is provided to maintain the bed in the non-use position and is so located as to have ready access by the passenger within the compartment. By virtue of the tubular construction the bed frame is of relatively light weight and yet provides a very strong structure, which is further facilitated and supported by the safety webbing having the additional function of assisting in moving the bed frame and mattress to the non-use position.

BRIEF DESCRIPTION OF THE DRAWINGS

FIG. 1 is a perspective view of a portion of a sleeping compartment showing the improved sleeping berth in the use position;

FIG. 2 is a cross-sectional view through the compartment shown in FIG. 1 showing in elevation a sleeping berth in the use position;

FIG. 3 is a sectional plan view through the sleeping compartment showing the sleeping berth in elevational plan view in a use position;

FIG. 4 is a cross-sectional view through the sleeping compartment showing the berth in a use position taken along the line 4—4 of FIG. 3;

FIG. 5 is a cross-sectional view taken along line 5—5 of FIG. 3;

FIG. 6 is a cross-sectional view taken along line 6—6 of FIG. 5;

FIG. 7 is a view taken substantially along line 7—7 of FIG. 3;

FIG. 8 is a cross-sectional view taken substantially along line 8—8 of FIG. 7;

FIG. 9 is a cross-sectional view taken substantially along line 9—9 of FIG. 3;

FIG. 10 is a cross-sectional view taken substantially along line 10—10 of FIG. 9; and FIG. 11 is a cross-sectional view of a spring loaded hinge arrangement taken substantially along line 11—11 of FIG. 2.

DESCRIPTION OF THE PREFERRED EMBODIMENT

As shown in FIG. 1, a railway car 10 includes a car side 11 provided with a window 12. The car 10 includes a conventional roof 13 having an inner ceiling 14. The car is divided into a plurality of compartments 15 which are separated by means of divider walls 16 supported on a floor 17 adjacent to an aisle 18. The divider walls 16 are connected to transversely extending partition walls 19 and the compartment includes a conventional compartment seat and bed structure 20, above which is positioned on opposite sides of the compartment head rests 21.

A movable sleeping berth 22, includes a bed frame 24 of tubular construction. The bed frame 24 is formed of one piece and includes a front tubular member 25, connected by side tubular members 27 with the rear tubular member 26 having adjacent tube ends 23 to form the tubular frame structure. The bed frame 24 also includes an intermediate arcuate frame member 28 which is connected at its rear-most end by means of a stamped fitting 29 to the rear member 26 at the meeting of the tube ends 23. The stamped fitting 29 includes a pair of upper and lower semi-cylindrical segments 30 conforming to the shape of the intermediate tubular member 28 and which are connected by means of a cylindrical strap 31. As best shown in FIG. 5, strap 31 substantially envelopes the tube ends 23 and semi-cylindrical segments 30 are firmly connected in position against the intermediate member 28 by means of blind rivets 32 well known in the art. The bed frame 24 is hingedly connected to the side wall 11 of the compartment by means of hinge brackets 33 which, as best shown in FIG. 8, include a hinge bearing support 34, including cylindrical bearing portion 37 shaped to conform to the configuration of the tubular member 26, and being provided with flat strap portion 35 and 36 which are rigidly connected to the car side 11 by means of screws 39. The bearing support 34 also is provided with a cylindrical anti-friction bearing 38 within which the tube 26 is free to rotate during hinging movement.

As best shown in FIG. 7, the cylindrical bearing portion 37 also includes a slot 40 within which a stop rivet 41 is disposed. During hinged movement of the frame, the rotation of the rear tubular member 26 provides for guided movement of stop rivet 41 within the slot 40 and prevents longitudinal displacement of the frame relative to the hinge members.

A conventional mattress 42 is provided for the bedframe 24. The mattress is shown in broken lines in FIGS. 2 and 4, and is supported above the intermediate tubular member 28 by flexible, horizontal and longitudinally extending straps 43 and laterally extending straps 44. Straps 43 and 44 are flexible or may be of rigid design and connected to the tubular frame by means of short springs. In the present instance the straps are shown as flexible to provide a supporting webbing for supporting the mattress and the passenger carried thereon.

Referring now particularly to FIGS. 3, 4, 9, and 10, a latch member designated at 45 is supported on the front tubular member 25 and intermediate member 28. The connection of the intermediate member 28 to the frame member 25 is by means of a construction similar to that shown in FIGS. 5 and 6, which include semi-cylindrical segments 46 and semi-cylindrical strap 47 connecting said segments and connecting said tubular members 25 and 28 rigidly by means of rivets 48. A housing generally designated at 49 includes a pair of ears 50, as best shown in FIG. 9, which are secured to the semi-cylindrical strap 47 by means of screws 51. The housing 49 also includes an opening or slot 52 which is adapted to receive a stop pin or keeper member 53. The keeper member 53, as best shown in FIG. 2, is adapted to be engaged within the slot 52 to maintain the bed frame in the stowed position. A spring-type lever 54 is contained within the housing and is suitably semi-rigidly connected at one end as indicated at 54' to the housing 49. The lever 54 includes an opening 55, an edge of which, as shown in FIG. 10, is seated upon the member 53 so as to retain the bed frame in its uppermost or non-use stowed position. The lever 54 is flexible in its connection at 54' and a leaf spring 56 is suitably connected as indicated at 57 to a spacer 58, which in turn is rigidly secured to the arcuate member 28 by means of a rivet 59. Thus, the bed may be secured by a simple latch element in its non-use position as indicated. As best shown in FIG. 1, the side tubular members 27 also may have connected to their lower edges a spacer bar 60 which, when the bed is in the use position shown in FIG. 1, is engaging and seated upon the head rest 21 disposed at opposite ends of the compartment thereby also assisting in the support of the bed in the use position.

The safety webbing generally designated at 61 also supports the frame and mattress in the use position. Hinge plates 62 are connected to the ceiling 14 and, as best shown in FIG. 11, include tubular hinges or barrels 63 containing hinge pin 64. Each barrel 63 is provided with a suitable slot 65 through which extends rigid or semi-rigid strap 66 connected to the hinge pin 64. The semi-rigid straps 66 extend downwardly and form the upper ends of the safety webbing 61. As shown in FIG. 11, suitable coil spring 67, which is anchored at 68, and which is also secured and anchored to the hinge pin 64, continually urges rotation of the hinge pins 64 and straps 66 from the position shown in FIG. 2 upwardly and outwardly to the non-use position shown in FIG. 2 in dotted lines. As best shown in FIGS. 1 and 4, the safety webbing 61 also includes a transversely extending connecting strap 69 which is connected to the semi-rigid straps 66 and which in turn connects flexible straps 70 to semi-rigid straps 66.

The Operation

To lower the bed into the sleeping position shown in FIGS. 1 and 2, the passenger merely presses upwardly on the flexible lever 54 which disengages the opening 55 from the keeper 53 thereby permitting the bed frame to hinge downwardly on the hinge brackets 33 to the use position shown in FIGS. 1 and 2. By having the lever 54 readily accessible beneath the bed frame, the lowering of the bed is a simple process since the passenger immediately has a hold of the lever and frame for expeditious lowering into position. The bed is suitably supported on the head rest 21, as well as by the safety webbing 61 which assures safety of the passenger from accidentally being dislocated from the berth while sleeping. The arcuate shape of the intermediate member 28 assists in the comfort of the passenger by providing hip clearance, and the mattress and webbing provide for a comfortable sleeping berth. The hinging of the frame is expedited by means of the anti-friction bearings 38 mounted within the hinge brackets 33 which connect the frame to the side wall 11. Thus, a very light berth is achieved with a relatively strong frame and with safety webbing which assures the complete safety of the passenger. As best shown in FIG. 4, the safety webbing 61 is longitudinally spaced toward one end of the berth, thereby providing the passenger with access to the berth at the other end.

To place the bed into the non-use position shown in phantom lines in FIG. 2, the passenger merely pushes upwardly on the frame, hinging the same upwardly whereupon the hinges 63 and hinge pins 64 and coil springs 67 cause the semi-rigid straps 66 to pivot upwardly and outwardly into the broken line position shown in FIG. 2, with very little further effort on the part of the passenger. The spring-type lever 54 is then engaged with the keeper 53 and the frame and bed are again held in the non-use or stowed position.

It is believed to be readily apparent that the arrangement provides for a lightweight berth construction which is easily manipulated into its various positions and which provides for the safety of the passenger with a minimum of effort on his part in moving the bed between use and non-use positions.

What is claimed is:

1. A suspended sleeping berth arrangement supported on a side wall and ceiling structure comprising;

a bed frame including front and rear side frame members, end frame members connected to said side frame members, said frame members including means for supporting a mattress thereon, hinge means connected to said wall and to said rear frame members whereby said bed frame may be hingedly moved between relatively horizontal in-use and vertical non-use positions, flexible means connected to said frame for suspending said frame from said ceiling, said flexible means urging said frame into said non-use position during initial manual hinging movement of said frame, manually operable latch means on said front frame members and, a keeper element on said ceiling structure engaging said latch means for maintaining said frame in said non-use position, said latch means including a latch lever movably connected to said front frame members, means on said lever in a latched position engaging said keeper element, and said lever being accessible below said frame in said non-use position.

2. The invention in accordance with claim 1, said latch lever including means biasing the same into said keeper engaging position.

3. A suspended sleeping berth arrangement supported on a wall and an overhead structure comprising;

a bed having a wall side means and a user access side means, hinge means connected to said wall and to said wall side means of the bed for swinging said bed between a relatively horizontal sleeping position outwardly of the wall and a vertical stored position adjacent the wall, suspension means connected with the overhead structure and the access side means of said bed for suspending said bed from above in the horizontal position, and means operably associated with said suspension means and operable to move the suspension means in a stowed position assisting to move the bed into the stored position.

4. The invention in accordance with claim 3, and said suspension means including vertically extendable flexible strap means connected to said bed and providing a safety webbing to prevent falling of the user during the sleeping position.

5. The invention in accordance with claim 3, and said suspension means including substantially rigid strap means having a hinge connection means coupling with said overhead structure and substantially flexible strap means connected to said rigid straps and to the access side means, means operably including biasing means coupled with said hinge connection means and urging said rigid strap means to move said bed to said stored position during initial movement of said bed toward said stored position.

6. The invention in accordance with claim 5, and said biasing means including a spring actuated means connecting with said strap means and said overhead structure.

7. The invention in accordance with claim 3, and said bed comprising tubular members, and hinge means having tubular bearing members connected to said wall and supporting said wall side means of the bed.

8. The invention in accordance with claim 7, and said bearing members including anti-friction sleeves disposed between said bed wall side means and said bearing members.

9. The invention in accordance with claim 8, and said bearing members and said bed wall side means including interengaging stop means for limiting the hinge movement of said bed below a horizontal position.

10. The invention in accordance with claim 3, and including manually operable latch means on said access side means and, a keeper element on said structure engaging said latch means for maintaining said bed in said stored position.

11. The invention in accordance with claim 10, and said latch means including a latch lever movably connected to said access side means, means on said lever in a latched position engaging said keeper element, said lever being accessible below said access side in said stored position.

12. The invention in accordance with claim 11, and said latch lever including means biasing the lever into said keeper engaging position.

13. The invention in accordance with claim 3, and said suspension means including a plurality of vertically, extendable, flexible horizontally spaced straps connected to the access side of said bed.

14. The invention in accordance with claim 3, and said means operably associated with said suspension means comprising biasing means associated with the overhead structure and the suspension means the operative to move said suspension means into an overhead location in the stowed position.

15. The invention in accordance with claim 14, and said biasing means comprising hinged means and a biasing member operatively connected with the hinge means and operative to elevate the suspension means attendant to stowing of the suspension means.

16. The invention in accordance with claim 3, and said suspension means including a substantially rigid strap means operably connected with the means operably for acting on the strap means attendant to stowing same.

17. The invention in accordance with claim 3, and said suspension means including a rigid strap means connecting with the overhead structure and flexible strap means connecting with the rigid strap means and with the access side means of the bed.

18. The invention in accordance with claim 3, and said means operably associated with said suspension means including a biased hinge means, said suspension means including rigid strap means connected with said hinge means and flexible strap means connected with said rigid strap means and said access side means of said bed, and said means operably associated with said suspension means including biasing means operatively connected with the hinge means and the rigid strap means and operative to pivot the rigid strap means and the flexible strap means thereby into an overhead stowed position above the bed.

19. The invention in accordance with claim 18, and said rigid means being movable to an upper substantially horizontally extending position with said flexible means and said rigid means being stored above said bed in the stored position of the bed, whereby the flexible means is stowed out of obstruction with the berth user.

20. The invention in accordance with claim 3, and manually operable latch means on said access side and a keeper element on side overhead structure engaging said latch means for maintaining the bed in a stored position, said latch means including a latch movably connected to said access side means, and means on said lever in a latch position engaging the keeper element, said lever being accessible below said access side means in said stored position, and said latch lever including means biasing the lever into said keeper engaging position.

21. The invention in accordance with claim 3, and the connection of upper end of said suspension means to the overhead structure being closer to the wall than the connection of the lower end of the suspension means to the access side of the bed.

22. The invention in accordance with claim 21, and said suspension means having an upper substantially rigid portion and lower substantially flexible portion.

* * * * *